(12) United States Patent
Jespersen

(10) Patent No.: US 8,651,148 B2
(45) Date of Patent: Feb. 18, 2014

(54) BENDABLE PRE-INSULATED PIPELINE ASSEMBLY

(75) Inventor: Hans Melby Jespersen, Vejle (DK)

(73) Assignee: Logstor A/S, Logstor (DK)

( * ) Notice: Subject to any disclaimer, the term of this patent is extended or adjusted under 35 U.S.C. 154(b) by 9 days.

(21) Appl. No.: 12/678,448

(22) PCT Filed: Oct. 1, 2008

(86) PCT No.: PCT/DK2008/000341
§ 371 (c)(1),
(2), (4) Date: Jun. 9, 2010

(87) PCT Pub. No.: WO2009/043351
PCT Pub. Date: Apr. 9, 2009

(65) Prior Publication Data
US 2010/0260551 A1 Oct. 14, 2010

(30) Foreign Application Priority Data
Oct. 2, 2007 (EP) .................................. 07019381

(51) Int. Cl.
*F16L 9/14* (2006.01)
(52) U.S. Cl.
USPC .......... 138/149; 138/148; 138/112; 428/36.91
(58) Field of Classification Search
USPC ............... 138/148, 149, 112–114; 428/36.91
See application file for complete search history.

(56) References Cited

U.S. PATENT DOCUMENTS

| | | | | |
|---|---|---|---|---|
| 4,054,985 A | * | 10/1977 | Aleniusson | 29/416 |
| 4,095,937 A | * | 6/1978 | Colburn et al. | 432/3 |
| 4,205,105 A | * | 5/1980 | Blundell | 428/36.4 |
| 4,239,064 A | * | 12/1980 | Gilman | 138/154 |
| 4,523,141 A | * | 6/1985 | Thomas et al. | 324/557 |
| 4,823,845 A | * | 4/1989 | Martin et al. | 138/149 |
| 4,909,282 A | * | 3/1990 | Staugaard | 138/149 |
| 6,000,437 A | * | 12/1999 | Ponder et al. | 138/149 |

(Continued)

FOREIGN PATENT DOCUMENTS

| CH | 633092 A5 | 11/1982 |
|---|---|---|
| DE | 102005031996 A1 | 4/2006 |

(Continued)

OTHER PUBLICATIONS

International Preliminary Report on Patentability. PCT/DK2008/000341. Date of completion of this report Aug. 12, 2009.

*Primary Examiner* — Patrick F Brinson
(74) *Attorney, Agent, or Firm* — Mollborn Patents, Inc.; Fredrik Mollborn

(57) ABSTRACT

This invention relates to a pipeline assembly especially for offshore installation comprising an inner carrier pipe, a casing and at least one closed-cell and/or solid thermal insulation material layer placed in between the casing and the inner carrier pipe, and the at least one insulation layer being directly or indirectly bonded to at least the casing and the inner carrier pipe. The pipeline assembly has improved bending properties which is achieved as the insulation material layer comprises at least one slit substantially transversely to the longitudinal direction of the pipeline assembly. The slit can be applied as a helical or circumferential cut, enabling the pipeline assembly to be rolled onto a reel or spool which greatly improves the pipeline assembly installation process. Methods of improving the bending properties of such a pipeline assembly are also described.

18 Claims, 4 Drawing Sheets

(56) References Cited

U.S. PATENT DOCUMENTS

| | | | | |
|---|---|---|---|---|
| 6,000,438 A | * | 12/1999 | Ohrn | 138/149 |
| 6,227,250 B1 | * | 5/2001 | Coutarel | 138/149 |
| 6,615,878 B2 | * | 9/2003 | Dewimille et al. | 138/149 |
| 6,981,525 B2 | * | 1/2006 | Foxton | 138/112 |
| 2006/0096652 A1 | * | 5/2006 | Navarro Niedercorn | 138/149 |

FOREIGN PATENT DOCUMENTS

| | | | |
|---|---|---|---|
| FR | 1330293 A | | 6/1963 |
| FR | 2831645 A1 | | 5/2003 |
| GB | 2407857 A | | 5/2005 |
| JP | 06174187 A | * | 6/1994 |

* cited by examiner

BENDABLE PRE-INSULATED PIPELINE ASSEMBLY

FIELD OF THE INVENTION

The present invention relates to a pipeline assembly comprising an inner carrier pipe, a casing and at least one closed-cell and/or solid thermal insulation material layer placed in between the casing and the inner carrier pipe, and the at least one insulation layer being directly or indirectly bonded to at least the casing and the inner carrier pipe. The invention further relates to a method of improving the bending property of such a pipeline assembly.

BACKGROUND

Very often fluids such as oil, natural gas and the like are transported to or from offshore installations or from one coastal line to another through long continuous pipeline systems laid out on the seabed. The pipelines therefore naturally have to be able to sustain the very special environmental conditions and extreme structural demands arising from the surroundings such as external pressure up to 20 bars or more, a very corrosion aggressive environment combined with high demands on the tightness on the pipes and all joints, extreme loadings during installation, resistance to wear, etc.

Different types of pipelines are used for such offshore applications including simple single un-insulated pipes, pipe-in-pipe systems with or without insulation material between the pipes and pre-insulated composite pipelines. The type of pipeline system depends for one thing on the fluid to be transported. In applications of transporting oil, the oil is very often mixed with some gasses and water resulting in methane hydrates forming in the mixture. If the pipelines are not sufficiently thermally insulated, the cooled methane hydrates solidify on the pipe walls eventually clogging the pipeline. In order to avoid this, additives such as methanol and glycols are added to the oil/gas mixture which then, however, is to be boiled off at the receiving station and returned for reuse. Thermally insulated pipelines are also often necessary as the viscosity of some crude oils is too high to be pumped if the temperature of the oil becomes too low.

Alternatively, this issue can be avoided by the application of thermally insulated pipelines comprising an inner carrier pipe in which the fluid runs, an exterior casing or pipe and insulation material filling up the space there in between. Such an insulated pipe is disclosed in GB 2,407,857, which comprises a first and a second tubular and insulation material there between. Due to its low costs, the insulation material used is mineral wool which on its outer surface facing the second tubular is covered with a member such as a polymer. The mineral wool and the resilient member are helically arranged in the space defined by the first and second tubular. When the insulation pipe is rolled onto a reel, the mineral wool will open to overcome tensile stress caused by the bending of the insulation pipe. In order to center the first and second tubular relative to each other, this insulated pipe further comprises a number of spacers placed between the first and second tubular. In addition to the purpose of functioning as centralizers the spacers also serve to transfer the loads between the two tubular. The resilient mineral wool is therefore not damaged when this insulated pipe is wind and rolled onto reels and of the reels again. Thus the spacers are able to transfer the compressive stress. This however requires that the second tubular is rigid such that the bending moments exerted on this second tubular can be transferred to the first tubular. Last but not least the second tubular has to be rigid in order to withstand the inevitable pressure exerted on the pipe assembly when it lies on the seabed. A lack of sufficient rigidness of the second tubular would therefore lead to a bending of the second tubular casing along the distance between the spacers. This would eventually decrease the insulation properties of this insulated pipe, as the distance or space between the first tubular and the second tubular would vary along the whole pipeline. To be able to transfer the loads between the very rigid first and second tubular the distance between the spacers will have to be short. Since every spacer constitutes a potential thermal bridge, this would decrease the insulation properties of this insulation pipe. Having a rigid first and second tubular is expensive. These costs are further raised due to the cumbersome, labor intensive and time consuming application of spacers and the mineral wool during the manufacture of this insulated pipe. A sufficient rigidness of both tubular can be obtained by using metal. Since the seawater would be highly corrosive to the second tubular of metal, some sort of treatment of the outer surface of this tubular is required. This would add further to the costs of this insulation pipe. From a technical, insulating, and costwise viewpoint the insulated pipe disclosed in GB 2,407,857 is therefore not desirable.

Another alternative is disclosed in CH 633 092. Here the inner pipe is surrounded by a flexible corrugated pipe of synthetic material, which again is surrounded by a layer of foam material. Between the layer of foam material and the corrugated pipe a band of polyester is applied in order to prevent the foam material from migrating into the open 'valleys' of the corrugated pipe. The insulated pipe disclosed in CH 633 092 cannot be suitably applied on a seabed as the environment here is destructive for the outer foam material. In addition there is a great risk that the corrugated pipe will collapse due to the pressure present here. Further this insulated pipe will be difficult to roll on to a reel, as the corrugated pipe cannot transfer the bending moments exerted on the foam material to the inner pipe. This problem arises as the corrugated pipe is not bonded to either the inner pipe or the foam material. Hence there is a risk that the corrugated pipe will slide on the inner pipe and potentially collapse due to the bending moment exerted.

An alternative to this solution is to use closed-cell insulation foam between an inner carrier pipe and a lighter casing. The thermal insulation may also consist of one or more layers of solid or partly foamed thermoset or thermoplastic polymers. In order to transfer all thermal and structural loads from the inner carrying pipe to the exterior and vice versa an absolute and complete adhesion and bonding of the insulation material to both the inner pipe and the exterior casing is important. However, this bonding together with the necessary relatively high stiffness of the insulation layer due to the water pressure results in a pipeline which is relatively stiff and inflexible. Such a pre-insulated pipeline is thus not capable of being bent without severe damage to the exterior casing. Therefore, the pipelines are not capable of being wind and rolled onto reels, but will have to be manufactured in a number of straight and thus shorter sections to be assembled later on the spot. In offshore applications this implies a much slower installation process on board of an installation ship barge where the sections are welded together under difficult and unfavorable weather conditions. This unavoidably results in a far more expensive installation process, but also in higher risks of lower quality welds and joints than otherwise obtainable under well-controlled conditions in a production facility or compared to the installation processes of pipelines initially winded onto huge reels or spools.

SUMMARY OF THE INVENTION

The present invention provides a thermal insulated pipeline assembly with complete bonding or full adhesion between its layers, which provides increased bending properties for which all or some of the above-mentioned problems are avoided. The present invention further provides a faster and less involved method of installation of pipeline systems offshore, using the pipeline assembly of the present invention having properties capable of absorbing all forces and displacements arising during lay out as well as during operation.

According to one aspect of the present invention relates to a pipeline assembly comprising an inner carrier pipe, a casing and at least one closed-cell and/or solid thermal insulation material layer placed in between the casing and the inner carrier pipe, and the at least one insulation layer being directly or indirectly bonded to at least the casing and the inner carrier pipe. The pipeline assembly being characterized in that the at least one insulation layer comprises at least one slit substantially transversely to the longitudinal direction of the pipeline assembly whereby the bending properties of the pipeline assembly has been improved.

Hereby is obtained a pipeline assembly which is capable of being bent without severe fracture of the outer casing and isolation layer, i.e. the ability of the pipeline assembly to be bent, and its bending strain is increased. This is otherwise a great problem with pipeline assemblies of the type described above which are designed to withstand the high pressures at great water depths and which have adhesion or bonding between the insulation material and the carrier pipe and the outer casing ensuring load transfer between all layers of the pipeline assembly. Thus all loads leading to tensile stress, compressive stress and/or shear stress can be transferred between all the elements of the tubular composite, which the pipeline assembly is. The increased bending capability is advantageous in making it possible to reel the pipeline assembly onto big reels or spools making it possible to manufacture longer sections which then again results in fewer field joints and a faster manufacturing process. Further, most of the joints can be assembled or welded together onshore under controlled working conditions. Also, the installation process offshore from reels implies less installation work offshore and much faster deployment whereby the installation process becomes much less expensive. Even if the pipeline assembly could already be reeled prior to the application of the slit(s) in the insulation material layer(s), the improved bending properties caused by the slit(s) are still advantageous in that the diameter of the reel can be reduced to dimensions, which are more operable and where each reel or spool contain a length of pipe which is more workable. Hereby the risk of damaging the pipeline during reeling is reduced correspondingly. The above-described pipeline assembly with enhanced bending properties is thus advantageous for offshore as well as onshore applications. A further advantage over the prior art is that the load carrying/transferring capability of the insulation layer(s) lowers the requirement for a very rigid outer casing. Hence instead of e.g. a metal casing, a much less expensive polymer-based coating can be used as casing. This also simplifies the manufacturing process of the pipeline assembly, which can be continuous.

The pipeline assembly according to the invention could comprise just one layer of insulation material or several layers bonded together individually as well as to the inner pipe and outer casing. By stating that the insulation layer is directly or indirectly bonded to at least the casing and the inner carrier pipe is meant that an insulation layer may be bonded directly onto e.g. the carrier pipe or indirectly via e.g. a coating applied to the carrier pipe or via some other insulation layers. By the term 'outer casing' is here and in the following understood a layer of material acting as a casing, optionally an outer pipe. By the term 'slit' is here and in the following understood a slit, a fissure or a cut (however, not necessarily applied by cutting) in the insulation material layer which in principal has a zero or at least insignificant width, i.e. a slit where no or only insignificant material is intentionally removed. The number of slits and the distance between them can vary according to the width of the slit.

In one embodiment of the pipeline assembly, the at least one slit is made in the outer surface of the at least one insulation layer and/or has a depth of between 5-99% of the thickness of the at least one insulation layer. In the case where the insulation layer is comprised by a number of layers, the thickness is the added thickness of each of the layers. Thus in an embodiment of a pipe assembly comprising several insulation material layers, the slit can pass through some of these insulation material layers.

In further embodiments of the pipeline assembly according to any of the above, the at least one slit is at least partly helical, is shaped as a number of circumferential slits added at intervals along the length of the pipeline assembly and/or are at least partly formed as a number of slits shorter than the periphery of the at least one insulation layer. These different embodiments are advantageous in being easy, simple and fast to apply to the insulation layer(s) while on the same time ensuring an even distribution of the slits along the length of the pipeline. By a more or less even distribution is obtained that the pipeline assembly can be bent anywhere along its length and not only at some limited positions.

According to a further embodiment of the invention, the slits are added at least to the part of the pipeline assembly extending outwards from the center of a bending when bent.

In one embodiment of the pipeline assembly, the at least one insulation layer is at least partly of a thermoplastic polymer such as e.g. PP or PET, or at least partly of a thermoset polymer such as e.g. polyurethane.

In a further embodiment of the pipeline assembly, the at least one insulation layer is at least partly of expanded or syntactic foam which are advantageous in yielding high thermal insulation properties.

In yet a further embodiment of the invention, the pipeline assembly further comprises an anti-corrosion coating applied to the inner carrier pipe. Hereby is ensured a longer lifetime of the pipeline even in the worst case of the casing being broken and seawater given access to inner carrier pipe.

In another embodiment of the invention, the pipeline assembly further comprises a diffusion barrier between said at least one insulation layer and said casing. This layer serves to prevent a loss of liquid or gas through the outer exterior casing, or the converse, to prevent the inwards directed diffusion of liquid or gas, such as oxygen or seawater, which penetrate the wall from the outside.

In a further embodiment of the invention, the casing comprises an extra exterior layer of coating, such as a concrete coating. This is an advantage, as this extra layer can compensate for the buoyancy of the pipeline assembly.

According to another aspect, the present invention relates to the use of at least one slit to improve the bending properties of a pipeline assembly, the pipeline assembly comprising an inner carrier pipe, a casing and at least one closed-cell and/or solid thermal insulation material layer placed in between the casing and the inner carrier pipe, and the at least one insulation layer being directly or indirectly bonded to at least the casing and the inner carrier pipe, where the at least one slit is added to the at least one insulation layer substantially transversely to the longitudinal direction of the pipeline assembly. The advantages are here as described above.

According to a further aspect, the present invention relates to a method for improving the bending properties of a pipeline assembly, the pipeline assembly comprising an inner carrier pipe, a casing and at least one closed-cell and/or solid thermal insulation material layer placed in between the casing and the inner carrier pipe, and the at least one insulation layer being directly or indirectly bonded to at least the casing and the inner carrier pipe, where the at least one slit is added to the at least one insulation layer substantially transversely to the longitudinal direction of the pipeline assembly. Again, the advantages are as described above for the product.

In an embodiment, the at least one slit is added by cutting, which provides a simple, fast and well-controllable process of adding such a slit.

In further embodiments, the at least one slit is added in the outer surface of the at least one insulation layer and/or is given a depth of between 5-99% of the thickness of the at least one insulation layer.

Finally, the present invention relates to a method of offshore installation of one or more pipeline assemblies according to any of the above, where the pipeline assembly is rolled onto a reel, and the deployment of the pipeline assembly offshore is performed by unrolling the pipeline from the reel into the sea. The advantages from this are as described above in relation to the description of the pipeline assembly according to the invention.

BRIEF DESCRIPTION OF THE DRAWINGS

In the following the invention will be described referring to the figures, where.

DESCRIPTION OF EMBODIMENTS

Figure 1A:
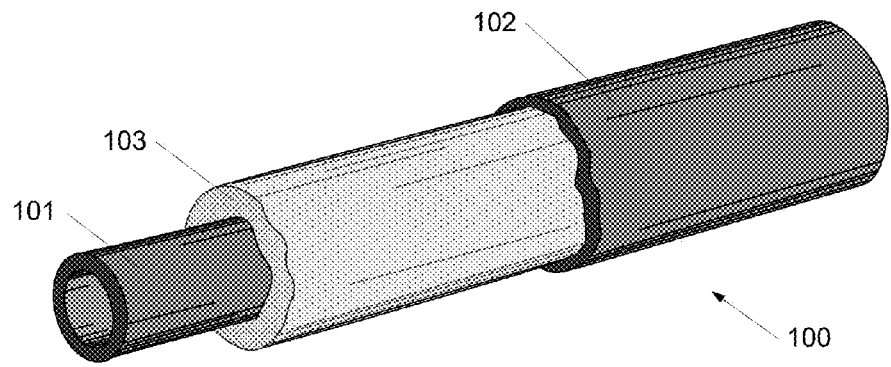
FIG. 1a illustrates a principal sketch of an insulated pipeline assembly as known in the art with its different elements.

FIG. 1a illustrates a principal sketch of an insulated pipeline assembly of the prior art, which is very often used for offshore applications for transporting fluids such as oil and/or gasses and water. The type of pipeline assembly 100 considered here is shown in a cross-sectional view and generally comprises an inner carrier pipe 101, an outer exterior casing 102 and one or more insulation layers 103 in between the carrier pipe 101 and the exterior casing 102. The relative dimensions of the different parts of the pipeline 100 are only to be taken figuratively. The pipeline assembly thus constitutes tubular composite or sandwich construction.

The fluid is transported in the inner carrier pipe 101 which—depending on the type of fluid to be transported—most often is made of some kind of metal such as some type of steel. The wall thickness of the carrier pipe 101 is chosen so that the pipe of a certain diameter is capable of withstanding the inner pressure from the fluid plus any possible material loss due to corrosion. A dimensioning factor for the inner carrier pipe may in some applications also be a certain minimum wall thickness relative to the pipe diameter to ensure enough flexibility of the pipe to be bent without buckling. In offshore applications, however, the carrier pipe being dimensioned to withstand the inner pressure from the fluid and/or the outer pressure resulting from e.g. the pipes installation on the seabed is in most cases already more than thick enough with respect to bending flexibility.

Figure 1B:
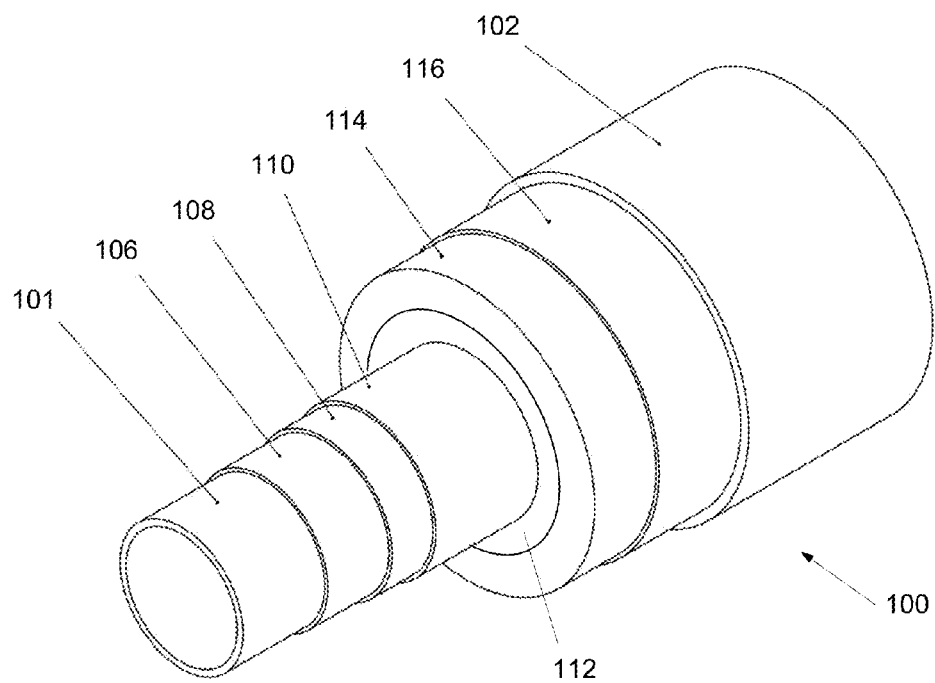
FIG. 1b illustrates another embodiment of an insulated pipeline assembly as known in the art with its different elements.

FIG. 1b illustrates another embodiment of an insulated pipeline assembly 100 of the prior art, which is also used for offshore applications for transporting fluids such as oil and/or gasses and water. The relative dimensions of the different parts of the pipeline 100 are only to be taken figuratively. The type of pipeline assembly 100 considered here is shown in a cross-sectional view and generally comprises an inner carrier pipe 101, an outer exterior casing 102 and two bonded insulation layers 112, 114 in between the carrier pipe 101 and the exterior casing 102. The outer side of the inner carrier pipe 101 is covered in a three layer PP coating constituted by a FBE (Fusion Bonded Epoxy) coating 106, a PP adhesive substance 108, and finally a PP coating 110. These coatings 106, 108, 110 act as an anti-corrosion agent and thus prevents the carrier pipe 101 from deteriorating from corrosion and at least maintain its fluid transporting capability for a much longer time in the worst case scenario where the outer casing 102 and perhaps the insulation layers 112, 114 are damaged. The coating materials 108, 110, could be made of e.g. FBE or PU (Polyurethane). The pipeline assembly 100 further comprises a diffusion barrier 116, which, among others, serve to prevent a loss of liquid or gas through the outer exterior casing 102, or the converse, to prevent the inwards directed diffusion of liquid or gas, such as oxygen or seawater, which penetrate the wall from the outside.

The thermal insulation layers 112, 114 primarily act to insulate the inner carrier pipe 101. In general, a pipeline assembly 100 may comprise several layers of thermal insulating material and not just only two. The layers may then be of different materials and/or have different material properties or may optionally be of the same material, but applied to the pipeline in more production steps. The thermal insulation layer is advantageously bonded to the carrier pipe either directly or indirectly via the coating layers 106, 108, 110. Hereby is obtained that changes in temperature of the fluid resulting in thermal deformations of the carrier pipe are directly transferred to the insulation layers 112, 114 and further out to the exterior seabed thereby minimizing wear between the different parts of the pipeline. If the pipeline assembly comprises several insulation layers, all the layers are correspondingly bonded to each other. Further, the material parameters of the insulation layer are determined by the importance of high strength and stiffness in compression and resistance to compressive creep. These aspects result in a choice of density of the insulation material on one hand yielding high compression stiffness (high density) and on the other hand maximal thermal insulation properties (low density). The importance of optimal compression properties in order to withstand the extreme pressure at water depths of several hundreds of meters further results in the necessity of using a closed-cell material where the air remains 'trapped' within the material, thus helping the material to withstand the pressure, keeping its thickness and thereby its thermal insulation properties. Alternatively, a solid thermal insulating material (such as for instance PP) can also be used, which then in general is applied in a much thicker layer in order to compensate for its lower insulation properties. On the contrary, an open-celled material such as an open-celled foam or a mineral wool, would, however, at high water depths be compressed to a compact material layer loosing its insulation properties. The insulation layer(s) of the pre-insulated pipeline assembly according to the invention could e.g. be of an Epoxy, Polyurethane, PP or PET or any other suitable solid or expanded thermoplastic or thermoset polymer material suited for the application. The thermal insulation layer(s) may also comprise hollow spheres to form a syntactic foam.

At its exterior the insulation layers 112, 114 are again bonded to an exterior casing or outer pipe 102. As before, the bonding or adhesion between the insulation layer and the casing is important in order to transfer all thermal and structural loads arising from the inner fluid under varying pressure and temperatures and/or the outer pressure from possible great water depths. Further, the casing mechanically protects the pipeline assembly from exterior loads, e.g. during the installation of the pipeline and must be watertight effectively preventing water from making its way into the insulation layer and the inner carrier pipe where the seawater would cause severe corrosion and decrease the lifetime of the pipeline assembly dramatically and reduce insulation efficiency. The casing thus needs to form a complete and unbroken exterior. The casing can e.g. be made of a layer of polyethylene, of polypropylene or solid polyurethane or any other suited plastic material. During the manufacturing process of the pipeline the outer casing is added onto the insulation layer by e.g. winding or extrusion. The casing 102 could also be in the form of an outer non-foamed layer, e.g. of the same material as a foamed or expanded insulation layer forming an integrated skin. Furthermore, the casing could also in some applications be coated with an extra exterior layer of material such as a concrete coating to compensate for buoyancy.

A composite pipeline assembly as described above however yields the severe drawback of being very inflexible. In contrast to e.g. most insulated heating pipes in accordance with EN 253 and EN 15632 in small diameters for onshore underground installation, the larger dimensions of offshore pipeline assembly cannot be reeled onto big spools or reels when manufactured. This because the outer casing can very suddenly break open and the insulation layer will break off together with the casing and delaminate from the inner carrier pipe leaving it fully exposed over a large area. An eventual fracture may start at some random minor irregularity in the insulation and casing materials. Increasing the ductility of the insulation material do not improve the bending capability of the pipeline assembly, but may instead influence the compression resistance negatively.

Figure 2:
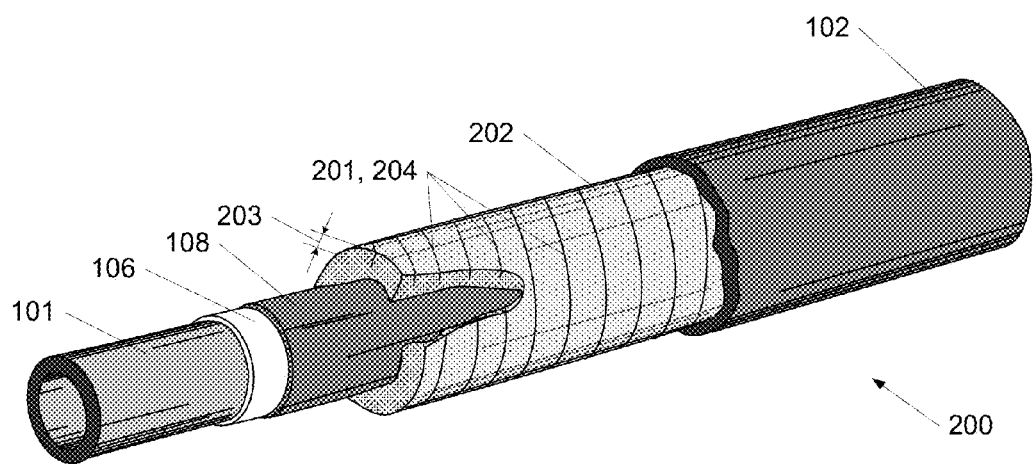
FIG. 2 illustrates an insulated pipeline assembly with increased bending properties.
Figure 3A:
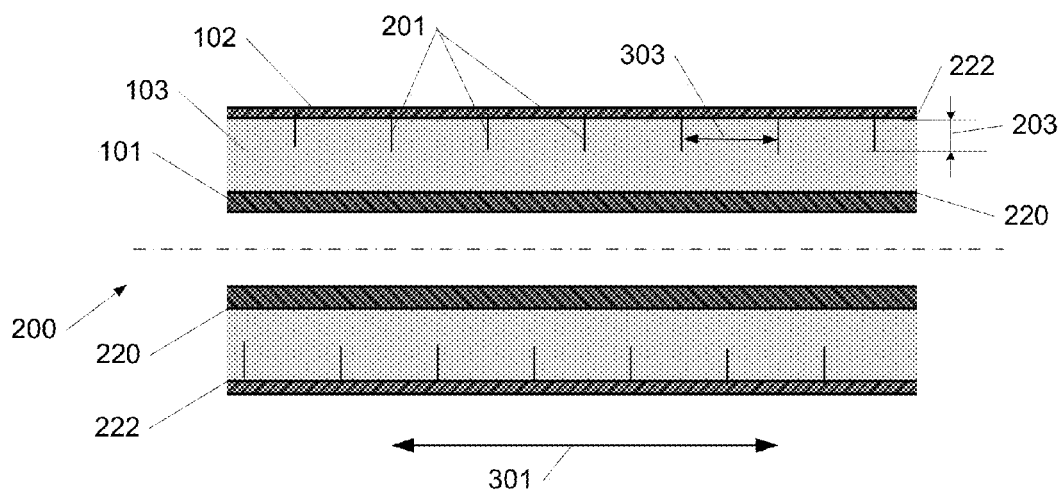
FIG. 3a illustrates the insulated pipeline assembly from FIG. 2 in a cross-sectional view.

The problems of the prior art are, however, eliminated with a pipeline assembly 200 as sketched in FIG. 2 and FIG. 3*a*. The material properties of the different elements of the composite pipeline assembly need not be altered. Instead a slit or a cut 201 has been added to and made in the insulation material layer 103. The slit fissure or cut (however, not necessarily applied by cutting) in the insulation material layer need not be of a significant width and can have an in principal zero width where no or only insignificant material is intentionally removed during the process of applying the slit.

The slit 201 is in one embodiment provided from the exterior surface 202 of the insulation material layer 103 extending some distance into the insulation layer. The slit(s) 201 do not extend out into the casing and need not extend all the way through the insulation layer, but can have a constant or varying depth 203, e.g. between 5-99% of the thickness of the insulation layer or layers. Experiments have been carried out showing good results for slits with a depth of 25-50%. In the embodiment illustrated in FIG. 2, one slit 201 is added to the insulation material layer 103 in the shape of a helical 204 winding around the pipeline assembly 200. The slit can advantageously be added by cutting with e.g. a rolling blade or the like prior to applying the exterior casing or outer pipe 102 to the insulated pipe 103. When seen in a longitudinal cross-sectional view as in FIG. 3*a*, the pipeline assembly 200 is in this way provided with a number of slits or cuts transversely to the longitudinal direction 301 of the pipeline and more or less equally spaced apart 303. In another embodiment of the invention, the slits are applied as a number of circumferential slits added at intervals in the insulation material layer along the length of the pipeline. The circumferential slits then may extend all or some of the way around the pipeline. The slits as described in general above result in pipeline assemblies with considerably increased bending capability in that the pipelines can be bent significantly without damaging fractures. The forces needed to bend the pipeline assembly are on the other hand not reduced compared to a pipeline assembly without one or more slits. Thus the direct or indirect bonding (indicated by 220, 222, 321) between the different layers, including inner carrier pipe and casing, contributes to the essential transfer of the loads when rolling the pipeline assembly onto reels.

As an example, a pipeline assembly without slit or cuts, of the below given dimensions, could not be bended to a radius required in EN 15632 (concerning flexible pipes), but only in the order of around 30 times the media pipe diameter before fatal failure and total fracture of the casing and partial rupture and delamination of the insulation layer from the inner carrier pipe.

| | |
|---|---|
| Inner carrier pipe (steel and 3LPP) Diameter × thickness | Ø323.9 × 16 mm |
| Insulation layer (PUR) Thickness | 40 mm |
| Casing pipe (HDPE) Diameter × thickness | Ø420 mm × 7 mm |
| Depth of slit into the insulation material layer | 15 mm |
| Distance between slits | 50 mm |
| Operation temperature (Installation) | −10° C. |
| Bending radius without slits | ~10 m |
| Bending radius with slits | 7 m |

An identical pipeline assembly was then added with a helically slit extending 15 mm into the insulation material layer. The angle of the helically winding slit was so that in a given longitudinal cross-section of the pipeline, the cuts occurred with a distance of 50 mm. The experiment was performed at −10° C. in order to take into account the negative effects of low temperatures on the material properties. This pipeline assembly could be bended to a radius of 7 meters without fracture, thus yielding a pipeline capable of being placed onto a reel.

The slits work by acting as a number of initiation points for cracks or fractures whereby controlled strain areas are obtained. Hereby the strain is more evenly distributed and evened out along the length of the pipeline. This means that the strain (energy) built up in the pipeline assembly when wind and rolled onto reels will apart from being used to bend the inner carrier pipe also, in a controlled way, be used for forming cracks. These cracks will as described, be initiated in the slits in the insulation material. Hence, a stress singularity building up at some random defect in the pipeline assembly and resulting in a fatal and rather violent fracture is avoided or at least postponed to occur at higher bending strain. A number of smaller, but uncritical cracks in the insulation material are formed leaving the casing and corrosion protection layer undamaged. When the pipeline assembly is straightened out again, the cracks in the insulation simply close completely without loosing the axial shear strength and integrity.

Figure 3B:
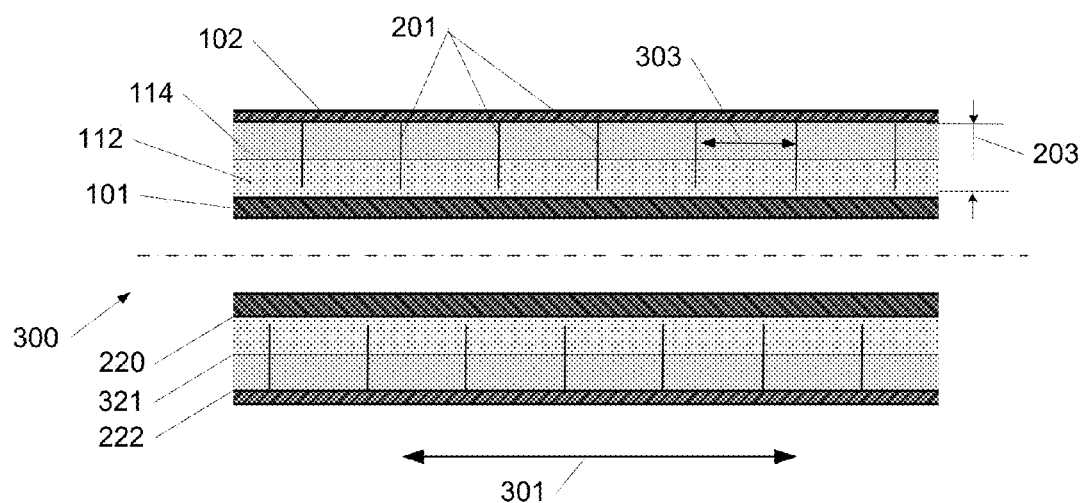
FIG. 3b illustrates an insulated pipeline assembly in a cross-sectional view, with two insulation layers.

FIG. 3b illustrates an insulated pipeline assembly 300 in a cross-sectional view, with two insulation layers 112, 114, which are bonded to each other and to the inner carrier pipe 101 and the outer casing 102, respectively. The slit(s) or cut(s) 201 go all the way through the outermost insulation layer 114 and a distance into the inner insulation layer 112. The slit(s) 201 in the two insulation layers must be substantially aligned, in order to obtain the desired bending ability. Further the slit(s) 201 do not extend out into the casing 102 and need not extend all the way through the insulation layers 112, 114, but can have a constant or varying depth 203, e.g. between 5-99% of the thickness of the insulation layer or layers Some of the major and advantageous characteristics of the present invention is that the:
- Closed cell insulation material is fully adhesive during manufacturing of the pipeline assembly, whereby the insulation layer(s) are direct or indirect bonded to the inner carrier pipe and the casing. All layers are bonded to each other in their respective interfaces.
- The insulation material is due its properties and due its direct or indirect bonding to the inner carrier pipe and casing able to transfer all types of forces resulting in tensile stress, compressive stress, and/or shear stress, which all occur when the pipeline assembly is wind and rolled onto reels.
- Slits acts as initiation points from where controlled cracks and fractures can originate.

The invention as described above is thus advantageous in providing a pipeline assembly with considerably increased bending ability in a way where the otherwise essential and desired properties of the pipeline are not destroyed or even reduced. These properties are i.a. the thermal insulating properties, the compression strength and stiffness of the insulation material layer, the water tightness of the casing and the bonding between the different parts of the pipeline assembly. This is in contrast to some of the known prior art in the field where e.g. a softer insulation material has been used perhaps increasing the bending flexibility, but also reducing the ability of the pipeline to withstand as high water pressures or applying the insulation material in distinct sections separated by spacers of different shapes, however, also reducing the bonding between the elements of the pipeline assembly in the longitudinal direction (apart from increasing the manufacturing costs considerably).

Figure 4:
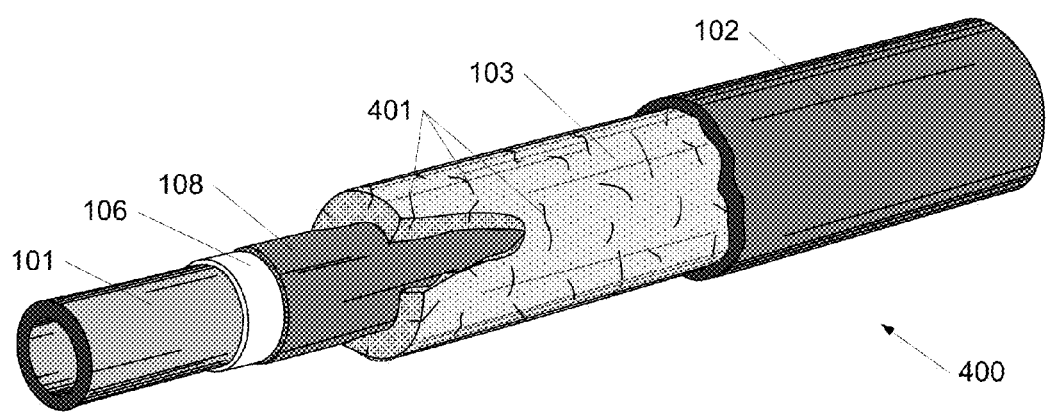
FIG. 4 illustrates different embodiments of the cuts applied to an insulated pipeline assembly according to the invention.

In FIG. 4 is illustrated an alternative embodiment of a pipeline assembly 400 with a number of slits 401 applied. Here, the slits comprise a number of relatively short and isolated cuts made in the isolation material layer 103. The cuts 401 are also here made in one or more directions transversely to the length of the pipeline assembly 400 and are in this embodiment more or less randomly distributed over the entire surface of the isolation layer. The important part is here that the cuts are present in some density at least on the part of the pipeline extending outwards from the center of the bending when bent. The slits can have varying depths, varying orientations and varying lengths and be placed in varying density. Further, the slits need not necessarily be straight, but can also be curved. If the insulation layer consists of several sub-layers of material, the slit(s) according to the invention may be applied to one or more of the sub-layers and/or optionally leaving one or more of the sub-layers untreated.

Figure 5:
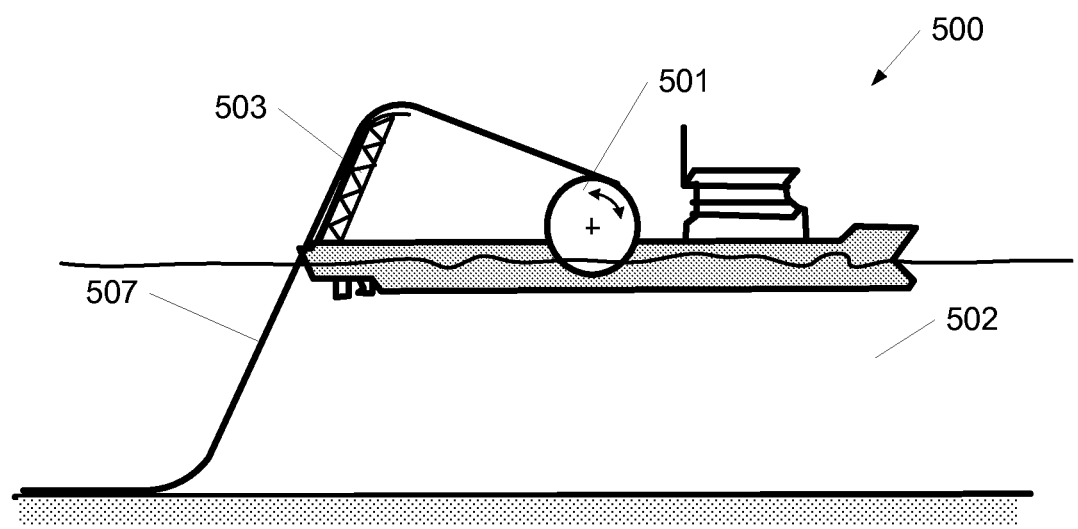
FIG. 5 illustrates the installation and laying out of a pipeline system according to the invention from reels on an offshore installation ship.

FIG. 5 illustrates the installation and laying out in principle of a pipeline system according to the invention from reels 501 on an offshore installation ship or barge 500. As the bending properties of the pipeline assembly has been improved, the pipeline can advantageously either be manufactured in longer sections or be assembled onshore into longer sections which are then bent or winded onto reels which are placed on or are later moved onto a deployment barge 500. When at the installation site offshore, the installation ship then deploys the pipeline 507 by unwinding the reel 501 e.g. over the stern of the ship optionally via some ramps or platforms 503 and into the sea 502 as illustratively sketched in the figure.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim.

DEFINITIONS

Pipeline assembly denotes a tubular composite or sandwich construction or component.

Bonding refers to the bonding between two adjacent layers of the pipeline assembly. This bonding is able to transfer all loads leading to tensile stress, compressive stress and/or shear stress. The term adhesion is in description of the present invention used as a synonym for bonding, meaning that the load transferring properties obtained by the adhesion are the same as for bonding.

Slit refers to the cut in the insulation layer of the pipeline assembly of the present invention. The slit defines a track in which the insulation layer can open and close in a controlled manner, when the pipeline assembly is rolled and unrolled on and from a reel. Thus the slit is analogue to a predefined deformation zone.

REFERENCES

100 Pipeline assembly
101 Inner carrier pipe
102 Outer exterior casing
103 Insulation layer
106 FBE coating (Fusion Bonded Epoxy)
108 PP adhesive substance
110 PP coating
112 Insulation layer
114 Insulation layer
116 Diffusion barrier
200 Pipeline assembly
201 Slit or cut
202 Exterior surface of the insulation material layer
203 Depth of slit or cut
204 Helical slit or cut
206 Extra exterior layer about the casing
220 Bonding
222 Bonding
300 Pipeline assembly
301 Longitudinal direction of the pipeline assembly
303 Distance between slit(s) or cut(s)
321 Bonding
400 Pipeline assembly
401 Slit(s) or cut(s)
500 Offshore installation ship or barge
501 Reel(s)
502 Sea
503 Ramp or platform
507 Pipeline

The invention claimed is:

1. A pipeline assembly (200,300,400) comprising an inner carrier pipe (101), a casing (102) and at least one closed-cell and/or solid thermal insulation material layer (103,112,114) placed in between said casing (102) and said inner carrier pipe (101), and said at least one insulation layer (103,112,114) being directly or indirectly bonded (220,222,321) to at least said casing (102) and said inner carrier pipe (101), wherein said at least one insulation layer (103,112,114) comprises at least one slit (201,204) substantially transversely to the longitudinal direction of the pipeline assembly (200,300,400), thereby improving the bending properties of the pipeline assembly (200,300,400) without damaging the casing, and maintaining other essential properties of the pipeline assembly (200,300,400) unchanged, the other essential properties including: thermal insulating properties, compression strength and thickness of said at least one insulation layer (103,112,114), water tightness of said casing (102), and the direct or indirect bonding between the insulation layer (103,112,114) and said casing (102) and said inner carrier pipe (101).

2. A pipeline assembly (200,300,400) according to claim 1, wherein said at least one slit (201,204) is made in the outer surface of said at least one insulation layer (103,112,114).

3. A pipeline assembly (200,300,400) according to claim 1, wherein said at least one slit (201,204) has a depth (203) of between approximately 5% and 99% of the thickness of said at least one insulation layer (103,112,114).

4. A pipeline assembly (200,300,400) according to claim 1, wherein said at least one slit (201,204) is at least partly helical.

5. A pipeline assembly (200,300,400) according to claim 1, wherein said at least one slit (201,204) includes a number of circumferential slits (401) added at intervals along the length of said pipeline assembly (200,300,400).

6. A pipeline assembly (200,300,400) according to claim 1, wherein said at least one slit (201,204) includes a number of slits shorter than the periphery of said at least one insulation layer (103,112,114).

7. A pipeline assembly (200,300,400) according to claim 1, wherein said at least one slit (201,204) are added at least to the part of the pipeline assembly (200,300,400) extending outwards from the center of a bending when bent.

8. A pipeline assembly (200,300,400) according to claim 1, wherein said at least one insulation layer (103,112,114) is at least partly formed from a thermoplastic polymer.

9. A pipeline assembly (200,300,400) according to claim 1, wherein said at least one insulation layer (103,112,114) is at least partly formed from a thermoset polymer.

10. A pipeline assembly (200,300,400) according to claim 1, wherein said at least one insulation layer (103,112,114) is at least partly formed from expanded or syntactic foam.

11. A pipeline assembly (200,300,400) according to claim 1, wherein said pipeline assembly (200,300,400) further comprises an anti-corrosion coating (106,108,110) applied to said inner carrier pipe (101).

12. A pipeline assembly (200,300,400) according to claim 1, wherein said pipeline assembly (200,300,400) further comprises a diffusion barrier (116) between said at least one insulation layer (103,112,114) and said casing (102).

13. A pipeline assembly (200,300,400) according to claim 1, wherein said casing (102) is coated with an extra exterior layer of material such as a concrete coating.

14. A method to improve the bending properties of a pipeline assembly (200,300,400), said pipeline assembly (200,300,400) comprising an inner carrier pipe (101), a casing (102) and at least one closed-cell and/or solid thermal insulation material layer (103,112,114) placed in between said casing (102) and said inner carrier pipe (101), and said at least one insulation layer (103,112,114) being directly or indirectly bonded (220,222,321) to at least said casing (102) and said inner carrier pipe (101), comprising:
   adding at least one slit (201,204,401) to said at least one insulation layer (103,112,114) substantially transversely to the longitudinal direction of the pipeline assembly (200,300,400)), thereby improving the bending properties of the pipeline assembly (200,300,400) without damaging the casing, and maintaining other essential properties of the pipeline assembly (200,300,400) unchanged, the other essential properties including: thermal insulating properties, compression strength and thickness of said at least one insulation layer (103,112,114), water tightness of said casing (102), and the direct or indirect bonding between the insulation layer (103,112,114) and said casing (102) and said inner carrier pipe (101).

15. A method to improve the bending properties of a pipeline assembly (200,300,400) according to claim 14, wherein said at least one slit (201,204,401) is added by cutting.

16. A method to improve the bending properties of a pipeline assembly (200,300,400) according to claim 14, wherein said at least one slit (201,204,401) is added in the outer surface of said at least one insulation layer (103,112,114).

17. A method to improve the bending properties of a pipeline assembly (200,300,400) according to claim 14, wherein said at least one slit (201,204,401) is given a depth (203) of between approximately 5% and 99% of the thickness of said at least one insulation layer (103,112,114).

18. A method of offshore installation of one or more pipeline assemblies (200,300,400) according to claim 1, comprising:
   rolling said pipeline assembly (200,300,400) onto a reel (501); and
   deploying the pipeline assembly (200,300,400) offshore by unrolling the pipeline from the reel (501) into the sea (502).

* * * * *